Feb. 12, 1963 T. A. O. GROSS 3,077,593
FEED-THROUGH NULLING SYSTEMS
Filed July 10, 1958 2 Sheets-Sheet 2

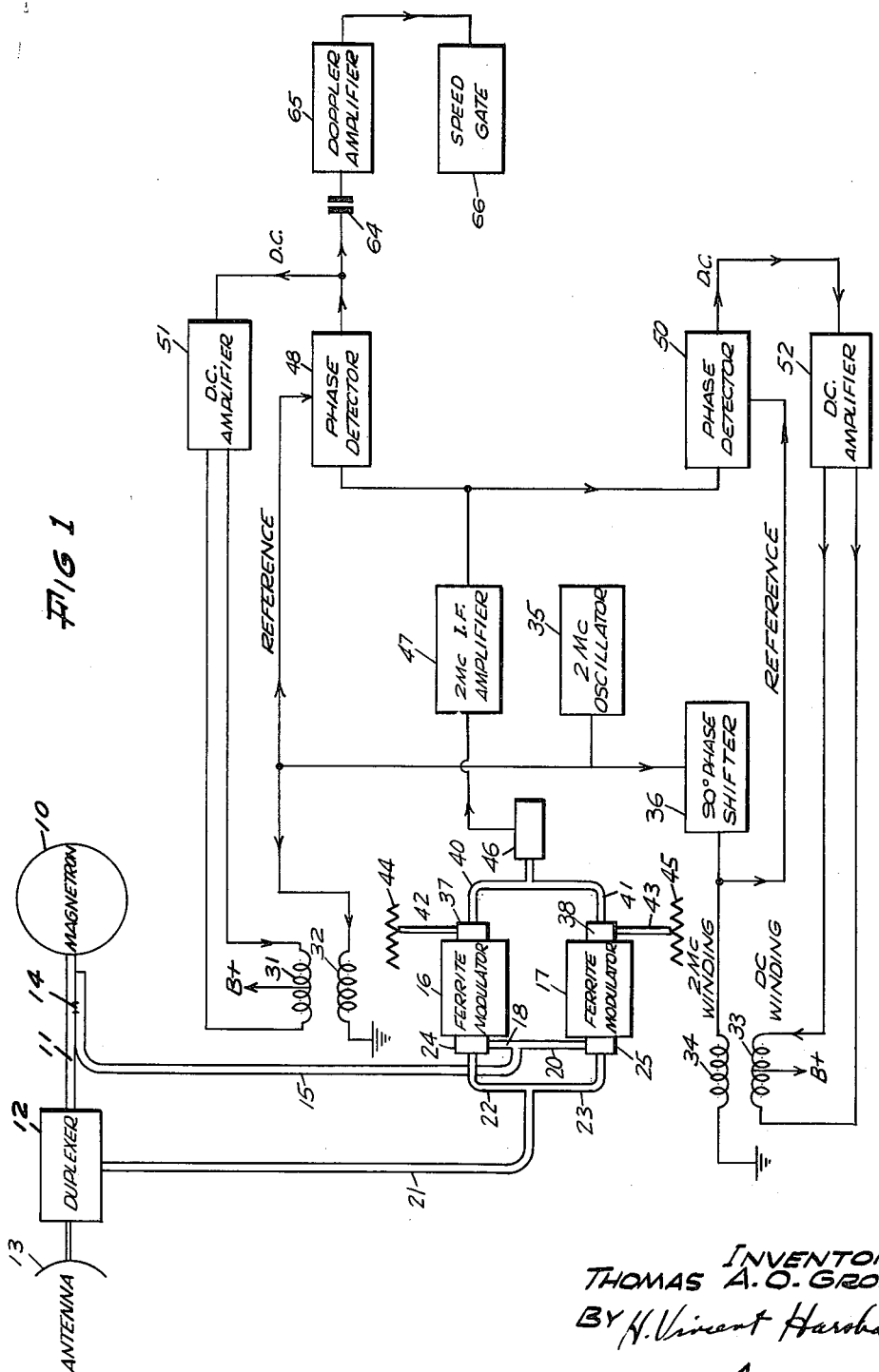

INVENTOR
THOMAS A. O. GROSS
BY /s/ Vincent Harsha
ATTORNEY

United States Patent Office 3,077,593
Patented Feb. 12, 1963

1

3,077,593
FEED-THROUGH NULLING SYSTEMS
Thomas A. O. Gross, South Lincoln, Mass., assignor to Raytheon Company, Lexington, Mass., a corporation of Delaware
Filed July 10, 1958, Ser. No. 748,567
7 Claims. (Cl. 343—8)

This invention relates to a feed-through nulling system for a continuous wave (C.W.) or other Doppler radar and more specifically to such a system in which, in addition to the generator for the transmitted signal, there is a single local oscillator that generates a signal at a lower frequency that is modulated on the reflected and received signal and a portion of the transmitted signal by means of ferrite modulators, the output of which is applied to a detector and the lower frequency components of the output of the detector are compared in phase with the low frequency oscillator output to produce a direct current which, when applied to the modulators, cancels any excess of feed-through signal in the input to the receiver.

In Doppler radars the output signal from the transmitter is a continuous wave of energy which is changed in frequency by reflections from a moving target. This change in frequency is called the Doppler effect and is detected by continuously comparing the frequency of the incoming reflected signal with that of the outgoing transmitted signal. The resulting signal at the difference or Doppler frequency is then fed to a receiver. Since it is necessary for the received frequency to be continuously compared with the transmitted frequency there must of necessity be close coupling between the transmitter and the receiver. This results in a portion of the transmitted energy being fed to the receiver. This energy regardless of how it is coupled to the receiver is what is referred to herein as the feed-through signal. Unfortunately, this feed-through signal results in saturation of the receiver and in degradation of the system sensitivity. This problem is especially severe where the same antenna is used for both transmitting and receiving by means of a duplexer. The result has been that Doppler radars have been limited in available output power in order to obtain a proportional reduction in feed-through signal. A form of feed-through nulling has been developed in which two ferrite modulators are arranged as a single side band modulator with an A.C. and a D.C. source of modulating current. In addition a local oscillator is provided to produce an intermediate frequency for the receiver.

By the present invention the same result is accomplished without the additional local oscillator with the output at about the modulating frequency serving as the intermediate frequency. With this system, in addition to the elimination of the local oscillator, there are no automatic frequency control problems when the set is tuned on or off abruptly as is the case when a high frequency local oscillator is used to obtain the IF.

The foregoing and other advantages and features of the invention will be better understood from the following description taken in conjunction with the accompanying drawings wherein:

FIG. 1 is a schematic diagram of a system embodying the invention;

Figure 3:
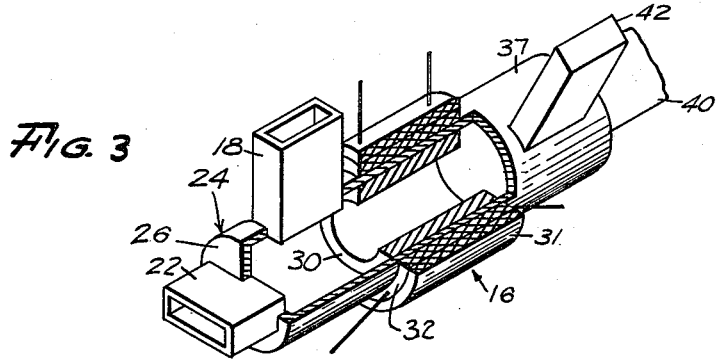
FIG. 3 is a simplified isometric drawing partly in section of one of the modulators of FIG. 2.

In FIG. 1 the reference numeral 10 designates a C.W. magnetron or other oscillator connected by waveguide 11

2 and duplexer 12 to antenna 13. Part of the microwave energy from the magnetron 10 is connected through directional coupler 14 and waveguide 15 to the ferrite modulators 16 and 17. The branch 18 of the guide 15 feeding the modulator 16 is made shorter than the branch 20 feeding the modulator 17 by a quarter wave length at the oscillator frequency so that the magnetron energy is fed to these modulators in phase quadrature. Reflected energy received by the antenna 13 from the target, shifted in frequency by the Doppler effect, is transmitted through the duplexer 12 to the ferrite modulators 16 and 17 through waveguide 21 and branches 22 and 23 of equal length.

Figure 2:
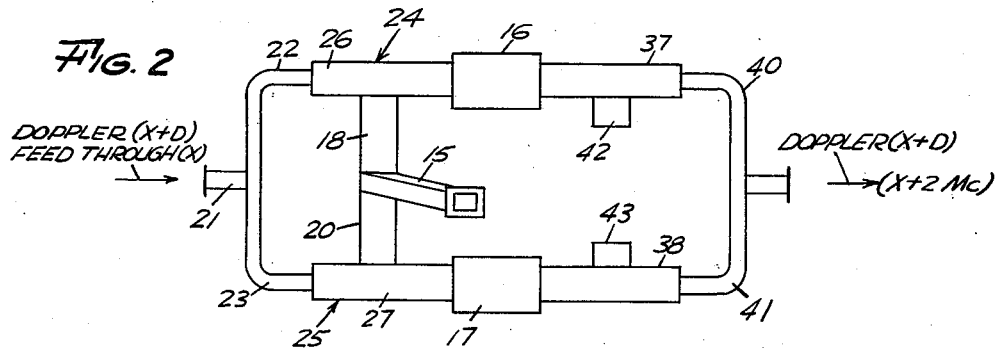
FIG. 2 is a simplified isometric drawing of the microwave circuitry of the feed-through nulling device of the system of FIG. 1.

The operation of the modulators can best be understood by reference to FIGS. 2 and 3. Signals from the magnetron 10 and the antenna 13 are applied to the modulators 16 and 17 through duplexers 24 and 25. These devices comprise, as best seen in FIG. 3, a section of square or round waveguide 26 or 27 in which microwave energy may be propagated in two polarities at right angles to each other. The rectangular guides 18, 20, 22 and 23 are so dimensioned that energy inserted into the duplexers 24 and 25 by one guide polarized in one plane cannot be propagated in the other guide which only propagates energy polarized in a different plane. Such duplexers are more fully illustrated in FIG. 8.45 and described on page 369 of "Microwave Duplexers" by Smullin and Montgomery, Volume 14 of the "Radiation Laboratory Series." Each of these modulators comprises a piece of ferrite 30, preferably in tubular form, and two magnetizing coils 31 and 32 or 33 and 34 arranged about each of these waveguides. One set of these coils 31 and 33 are supplied with a direct current obtained in a manner to be described and the other set of these coils 32 and 34 are supplied with an alternating current from an oscillator 35 at a frequency of 2 mc., for example. The alternating current supplied to the coil 34 is shifted 90° in phase by a phase shifter 36. The modulators 16 17 are each coupled to a second duplexer 37 or 38 having rectangular output waveguides 40 and 41 arranged to propagate radio frequency energy at the received signal frequency only when the ferrites 30 are magnetized. The two waveguides 42 and 43, which are terminated in loads 44 and 45, are arranged to propagate and absorb radio frequency energy at the received signal frequency when the ferrites are not magnetized. The waveguides 40 and 41 supplied detector 46. The output of the detector 46 is amplified in the 2 mc. amplifier 47 and applied to the phase detectors 48 and 50 where it is compared in phase with the output of the 2 mc. oscillator 35 unmodified and shifted 90° in phase, respectively, to produce a direct current output if the signals are out of phase. This current is amplified in D.C. amplifiers 51 and 52 to produce the direct current referred to above which is applied to the coils 31 and 33. When the signals are out of phase in one direction, current flows in one section of each coil, and when they are out of phase in the other direction, current flows in the other section. When currents appear in any of the coils 31, 32, 33 and 34, the ferrites 30 are magnetized and produce a rotation of the plane of polarization of the microwave energy propagating through them in a direction dependent on the direction of the magnetic field caused by the current flow in the coils. The polarization of the radio frequency from the magnetron propagating in the modulator is such that without any current flowing in the coils none of this energy will reach the detector but all will be dissipated in the loads 44 and 45. When sufficient current flows in coils 31 and 32 of the modulator 16 to rotate the polarization of the propagating energy through an angle of $\theta_1°$, energy is transmitted to the detector by a factor $\sin^2 \theta_1$, and to the load 44 by a factor $\cos^2 \theta_1$. Expressed another way the voltage transmission factor of energy reaching the crystal is sin $\theta_1$ which reverses in sign when $\theta_1$ reverses. The same applies to the modulator 17 which supplies radio frequency energy in an amount determined by the polarization rotation angle $\theta_2$ of modulator 17. Thus an RF signal of any phase and of an amplitude in excess of a minimum portion of the transmitted signal from the magnetron 10 can be added to the received signal at the detector by properly choosing $\theta_1$ and $\theta_2$.

Since the transmitted microwave signals entering via waveguide 18 are in phase quadrature, and the 2 mc. modulating signals applied to the coils 32 and 34 are also in phase quadrature, the sum of these microwave signals at the detector 46 is a single frequency pilot signal displaced 2 mc. from the microwave source frequency. This displacement is determined by the frequency of the output of the oscillator 35 which should be at the highest frequency at which the modulators 16 and 17 may be made to operate efficiently.

Figure 4:
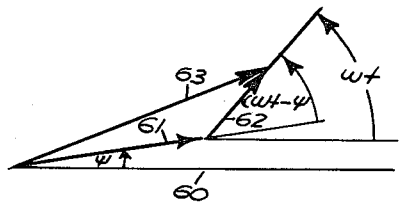
FIG. 4 is a vector diagram of the output of the modulator.

FIG. 4 helps to show how the phase and amplitude of this signal are determined. The reference phase is indicated by line 60. The feed-through energy from the magnetron is indicated by the arrow 61 at an angle $\psi$ representing the phase of this energy. The pilot signal is represented by the arrow 62 at an angle $\omega$ to the reference representing its phase and at an angle $\omega t - \psi$ to the feed-through energy. The single side band frequency modulated wave generated in the modulator is indicated by the arrow 63. The envelope of this modulated wave has a phase angle determined by the phase of the feed-through signal and an amplitude determined by the smaller of the feed-through and pilot signals.

This 2 mc. signal is detected at the received crystal 46 along with the desired received signals. It is amplified in the 2 mc. amplifier 47 and detected in two phase sensitive detectors 48 and 50 having reference signals applied in quadrature. These phase detectors may be of the type illustrated in Fig 35–V and described on page 322, paragraph of 30 of "The Electronic Control Handbook" by Batcher and Moulic. The output of phase detector 48 is amplified by integrating D.C. amplifier 51 and the resulting D.C. signal applied to coil 31 of the ferrite modulator 16. The output of phase detector 50 is amplified in D.C. amplifier 52 and the output applied to coil 33 of modulator 17. These D.C. currents add the proper amplitude and phase of RF energy to cancel out the feed-through. In effect the phase detectors produce an error signal and the D.C. windings on the modulators close a servo loop. The output of phase detector 48 also contains a signal proportional to the Doppler frequency which is coupled through capacitor 64 and Doppler amplifier 65 to the speed gate 66 to give the desired output signal. The time constants of the system are selected so that the lowest Doppler frequencies of interest are not inordinately degenerated.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. In a Doppler radar system a first source of radio frequency energy, means for propagating and receiving such energy, a pair of modulators, a second source of radio frequency energy at a second frequency, means to apply the output of said second radio frequency source to said modulators, means to compare signals from one of said modulators at a frequency differing from that of the second source by the same amount as that by which the frequency of the received energy differs from that of the transmitted energy in phase with the signals from said second source, means to compare in phase signals from the other of said modulators at this frequency with the signals from the second source shifted 90° in phase, and means to apply the signals from each phase comparison means to its associated modulator to obtain a signal determined by the difference in frequency of the transmitted and received signal without excessive energy at the transmitted frequency.

2. In a Doppler radar system a first source of radio frequency energy, means for propagating and receiving such energy, a pair of microwave modulators, a second source of radio frequency energy at a second frequency, means to apply the output of said second radio frequency source to said modulators, means to compare the output of one of said modulators at a frequency differing from that of the second source by the same amount as that by which the frequency of the recived energy differs from that of the transmitted energy in phase with the output of said second source, means to compare in phase the output of the other of said modulators at this frequency with the output of the second source shifted 90° in phase, and means to apply the output of each phase comparison means to its associated modulator to obtain a signal determined by the difference in frequency of the transmitted and received signal without excessive energy at the transmitted frequency.

3. In a Doppler radar system a first source of radio frequency energy, means for propagating and receiving such energy, a pair of modulators comprising ferrite microwave gyrators, a second source of radio frequency energy at a second frequency, means to apply the output of said second radio frequency source to said modulators, means to compare the output of one of said modulators at a frequency differing from that of the second source by the same amount as that by which the frequency of the received energy differs from that of the transmitted energy in phase with the output of said second source, means to compare in phase the output of the other of said modulators at this frequency with the output of the second source shifted 90° in phase, and means to apply the output of each phase comparison means to its associated modulator to obtain a signal determined by the difference in frequency of the transmitted and received signal without excessive energy at the transmitted frequency.

4. In a Doppler radar system a first source of radio frequency energy, means for propagating and receiving such energy, a pair of modulators comprising ferrite microwave gyrators, means for applying said generated energy and said received energy to said gyrator in cross-polarization, a source of radio frequency energy at a second frequency, means to apply the output of said second radio frequency source to the said modulators, means to compare the output of one of said modulators at a frequency differing from that of the second source by the same amount as that by which the frequency of the received energy differs from that of the transmitted energy in phase with the output of said second source, means to compare in phase the output of the other of said modulators at this frequency with the output of the second source shifted 90° in phase, and means to apply the output of each phase comparison means to its associated modulator to obtain a signal determined by the difference in frequency of the transmitted and received signal without excessive energy at the transmitted frequency.

5. In a Doppler radar system a first source of radio frequency energy, means for propagating and receiving such energy, a pair of modulators comprising ferrite microwave gyrators, means for applying said radio frequency energy and said received energy to said gyrator in cross-polarization, means for directing said radio frequency energy between said gyrators in phase quadrature, a second source of radio frequency energy at a second frequency, means to apply the output of said second radio frequency source to said modulators, means to compare the output of one of said modulators at a frequency differing from that of the second source by the same amount as that by which the frequency of the received energy differs from that of the transmitted energy in phase with the output of said second source, means to compare in phase the output of the other of said modulators at this frequency with the output of the second source shifted 90° in phase, and means to apply the output of each phase comparison means to its associated modulator to obtain a signal determined by the difference in frequency of the transmitted and received signal without excessive energy at the transmitted frequency.

6. In a Doppler radar system a first source of radio frequency energy, means for propagating and receiving such energy, a pair of modulators, a second source of radio frequency energy at a second frequency, coil means to apply the output of said second radio frequency source to said modulators, means to compare the output of one of said modulators at a frequency differing from that of the second source by the same amount as that by which the frequency of the received energy differs from that of the transmitted energy in phase with the output of said second source, means to compare in phase the output of the other of said modulators at this frequency with the output of the second source shifted 90° in phase, and means to apply the output of each phase comparison means to its associated modulator to obtain a signal determined by the difference in frequency of the transmitted and received signal without excessive energy at the transmitted frequency.

7. In a Doppler radar system a first source of radio frequency energy, means for propagating and receiving such energy, a pair of microwave modulators comprising ferrite microwave gyrators, means for applying said radio frequency energy and said received energy to said gyrator in cross-polarization, means for directing said radio frequency energy between said gyrators in phase quadrature, a second source of radio frequency energy at a second frequency, coil means to apply the output of said second radio frequency source to said modulators, means to compare the output of one of said modulators at a frequency differing from that of the second source by the same amount as that by which the frequency of the received energy differs from that of the transmitted energy in phase with the output of said second source, means to compare in phase the output of the other of said modulators at this frequency with the output of the second source shifted 90° in phase, and means to apply the output of each phase comparison means to its associated modulator to obtain a signal determined by the difference in frequency of the transmitted and received signal without excessive energy at the transmitted frequency.

References Cited in the file of this patent
UNITED STATES PATENTS 2,755,463    Richmond _____ July 17, 1956